United States Patent
Whitmarsh et al.

(10) Patent No.: US 7,500,197 B2
(45) Date of Patent: Mar. 3, 2009

(54) EXTENSIBLE USER INTERFACE

(75) Inventors: Michael D. Whitmarsh, Vancouver, WA (US); William Hertling, Portland, OR (US); Mark Dovi, Sherwood, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1573 days.

(21) Appl. No.: 09/829,049

(22) Filed: Apr. 10, 2001

(65) Prior Publication Data

US 2002/0145627 A1  Oct. 10, 2002

(51) Int. Cl.
*G06F 3/00* (2006.01)
(52) U.S. Cl. .................................. 715/744; 715/740
(58) Field of Classification Search .............. 345/745, 345/740, 744; 715/745, 740, 866, 744
See application file for complete search history.

(56) References Cited

U.S. PATENT DOCUMENTS

| | | | | |
|---|---|---|---|---|
| 5,832,298 A | * | 11/1998 | Sanchez et al. | 710/8 |
| 5,990,884 A | * | 11/1999 | Douma et al. | 345/716 |
| 6,020,881 A | * | 2/2000 | Naughton et al. | 345/740 |
| 6,232,968 B1 | * | 5/2001 | Alimpich et al. | 345/744 |
| 6,446,192 B1 | * | 9/2002 | Narasimhan et al. | 712/29 |
| 6,529,214 B1 | * | 3/2003 | Chase et al. | 345/44 |

FOREIGN PATENT DOCUMENTS

| | | | | |
|---|---|---|---|---|
| EP | 1056001 A2 | 11/2000 | | |
| GB | 2347766 | * 9/2000 | | 3/12 |
| GB | 2347766 A | 9/2000 | | |
| WO | WO99/15955 | 4/1999 | | |
| WO | WO99/34284 | 7/1999 | | |
| WO | WO00/45249 | 8/2000 | | |

* cited by examiner

*Primary Examiner*—Dennis Bonshock (57) ABSTRACT

An extensible, network-based user interface allows remotely located resources to serve multiple clients. The user interface can be upgraded as improvements in resource capabilities are made, and as new products become available. The user interface includes a controller and other processing units and databases that collect, collate and process product and user information to dynamically construct client-specific user interfaces. The user interfaces may be used to select and control print options for networked printers. The network may be a local area network or the Internet. The user interface may maintain statistical information that is useable to predict technology trends, identify user preferences, and plan for maintenance and upgrade operations.

23 Claims, 7 Drawing Sheets

EXTENSIBLE USER INTERFACE

TECHNICAL FIELD

The technical field is mechanisms and method used to control print options.

BACKGROUND

Current printer systems rely on software mechanisms called printer drivers to control printing applications. In a typical networked computer application, the printer drivers are located on either local personal computers or network print servers. In a standalone configuration, the printer drivers are installed on a personal computer (PC). The printer drivers specify the manner in which the printing application is to be completed, and provide the user at the local terminal with various print options.

Currently, printer manufacturers develop printer drivers that are specific to a printer model and specific to each of the operating systems with which the printer will interface. The most widely used operating system in PCs is Windows®. An earlier, popular system was the disk operating system (DOS®). Both Windows® and DOS® are products of the Microsoft Corporation, Redmond, Wash. The DOS® operating system requires that applications include an embedded printer driver module that enables communications with a connected printer. An application, therefore, must have embedded in it an appropriate printer driver for a connected printer. If two or more printers of different kinds are connected to a computer having DOS® applications, each application requiring use of the printers must include embedded printer drivers for each printer type. By contrast, the Windows® operating system employs separate printer driver modules and all applications written for a Windows operating system are enabled to employ a printer driver module in a generic manner. Thus, Windows® applications have a standard interface that matches the preexisting printer driver module. If a computer is required to interface with two or more different types of printers, each requiring a separate printer driver, the Windows® operating system will require a printer driver module for each of the different type printers.

Other computers may use the Macintosh® operating systems, UNIX®, and other mechanisms. All these different operating systems, and the variations thereof, may require different printer drivers. For example, a Hewlett-Packard laser printer will have one printer driver for Windows® 95, but that printer driver will not work with the Macintosh® operating system. As a result, printers that support personal computers (PC) typically do not support Macintosh®. As a result, printer manufacturers typically make drivers for PCs and different drivers for Macintosh®. Developing, testing and marketing the different versions of the printer driver software is very expensive. In addition, delivery of the printer drivers to customers is expensive, and customers do not want to pay additional costs associated with software to allow printing.

Updates may be required because of changes to printer design, which is within the control of the printer manufacturer. Such updates may involve updating driver functionality and printer functionality. Other updates may be mandated because of changes or improvements in printer-related products and services. Some of these changes may also be controllable by the printer manufacturer. For example, a printer manufacturer may have a separate division that develops printer papers. The paper division may develop a new coating on photo glossy paper. Such paper may require modifications to the printer driver in order for a customer to print using the paper.

Some manufacturers have attempted to deliver printer driver upgrades over public networks, such as the Internet. However, such delivery mechanisms may fail if customers are not aware of the availability of the software, or if the customers install the software incorrectly.

Figure 1:
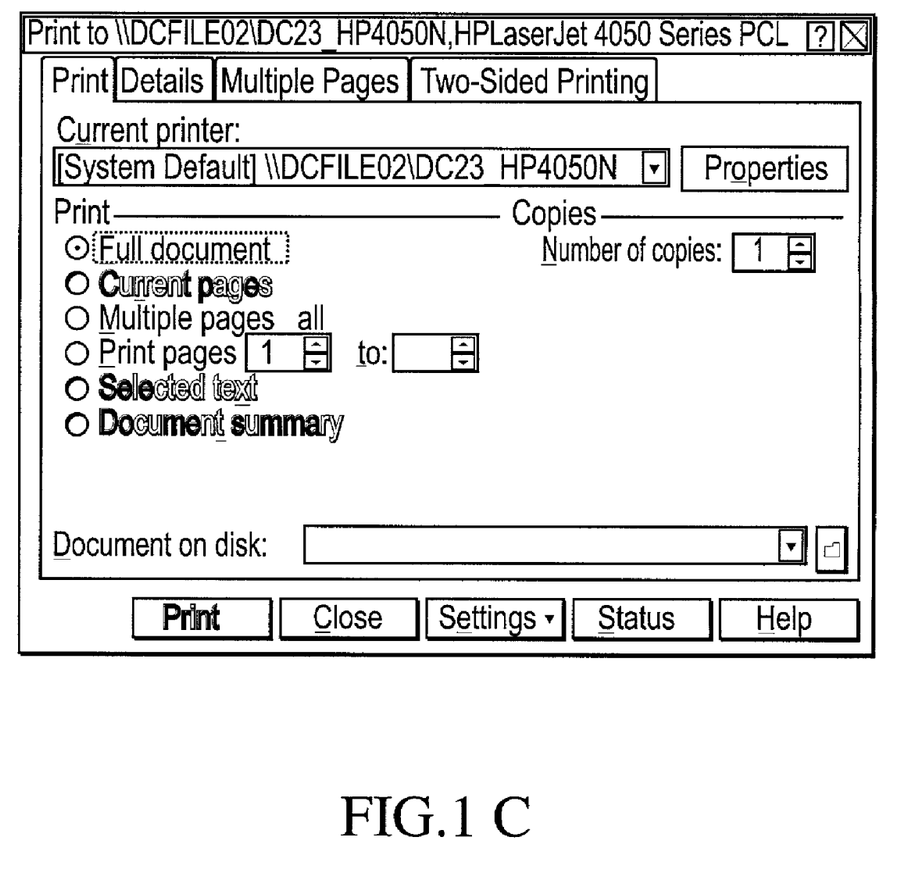
FIGS. 1A-1B illustrate prior art systems that use printer drivers to control print jobs.
FIG. 1C is a diagram of a prior art printer driver user interface.
Figure 1A:
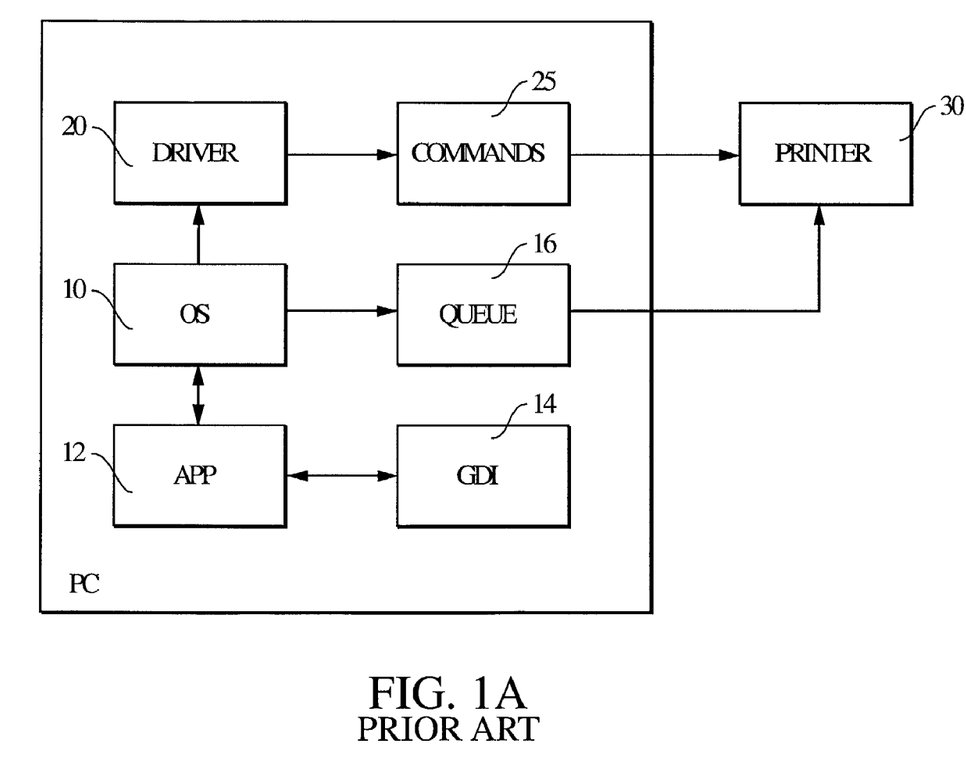

Traditional PC printer drivers are designed to be used on the PC where the application that is generating the print request resides. One such driver system is shown in FIG. 1A. A PC with an operating system 10 may host an application 12 that converts desired print data into graphical device interface (GDI) 14 or other text commands and graphics primitives with associated page positions and/or forms controls. A print job may be spooled 16 (i.e., stored) to allow the user to resume working with the application 12. These commands may be formatted by a printer driver 20 into a recognizable industry defined data definition (e.g. printer control language (PCL)) or the printer driver 20 may use the application 12 and/or platform intermediate commands (e.g., Windows® GDI primitives) and act on these commands to create internal direct printer commands 25 to control a printer 30. The printer 30 does not necessarily need to be physically attached to the PC where the application 12 and the printer driver 20 reside, but may be remotely located such as on a local area network (LAN) (not shown).

One benefit of having a PC-side printer driver system is the movement of the processing into the PC itself (rather than at the printer), thereby permitting more flexibility and control. Another benefit of this system is that more advanced functions are possible by using a more powerful host PC, while permitting cost minimization of the printer hardware itself.

Figure 1B:
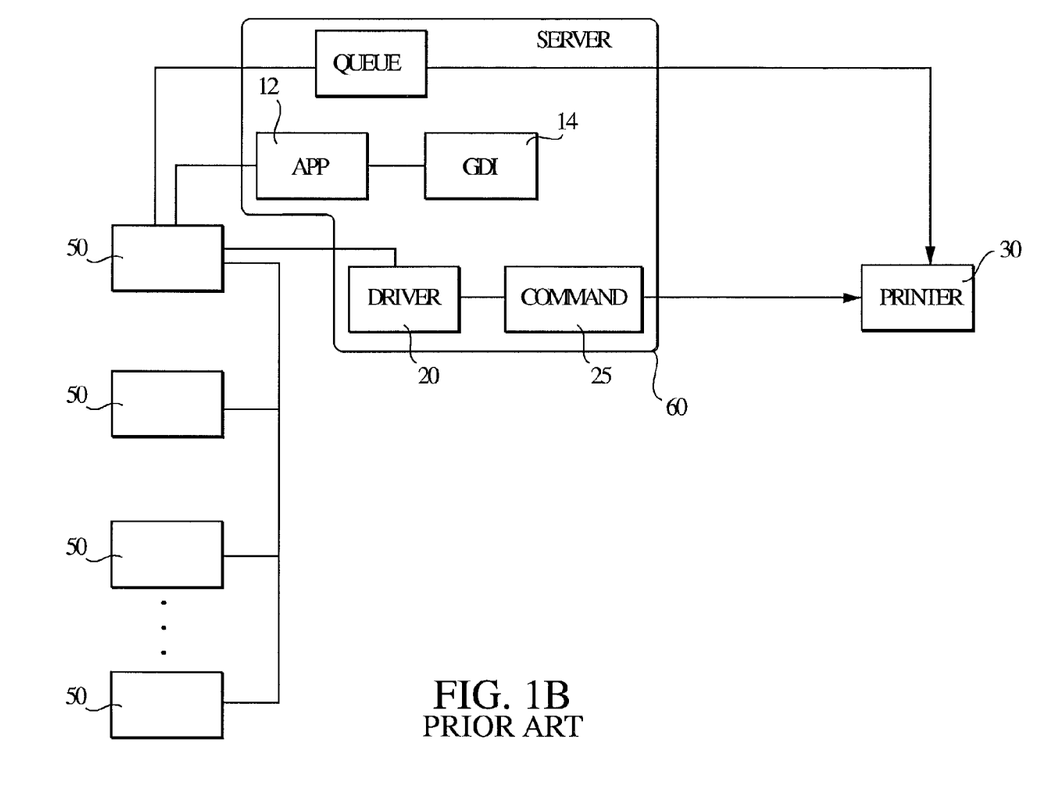

As one tries to fit the traditional host based printer driver models into a networked computer model (as shown in FIG. 1B), problems may occur because of limitation of the networked computers. These problems may be the result of limited random access memory (RAM) (to minimize costs). In contrast, almost all standard PC printer drivers use local spooling to the local permanent storage. If the RAM in a networked computer is limited, then there may be insufficient memory for the driver, application, and print data, especially if the print job entails color bitmaps or complex graphics images to be printed. Also, many networked computer devices that are being developed today have different operating systems and have different API and/or GDI interface definitions, which makes developing a printer driver extremely cumbersome.

Traditional printing implementations of networked computers 50 (see FIG. 1B) have followed the standard printing model. For example, in the networked computer system, a server 60 is used to load applications 12, communicate with the network, and store data needed by the networked computers 50. The networked computers 50 run the application 12, which might request printing. The other implementation details are the same as in the standard printing model for PCs (see FIG. 1A).

The benefits of this traditional networked computer printing model are that it is similar to current driver models and that user interface models are already known by platform. However, the networked computer system suffers from all the limitations described above for a PC system. In addition, the networked computer system raises other problems, such as severe memory and graphics limits on the networked computers. Also, networked computer hardware differences present unique issues with respect to operation of software thereon and the hardware that may be connected to a networked computer system. Furthermore, in a networked computer system where multiple networked computers are connected using a file server or interconnecting network to multiple printers, a number of administrative problems arise that are not present when a single PC is connected to a single printer. For example, if a new printer type is added to the networked computer system, each networked computer must be informed of the network configuration change and a new printer driver must be installed on each networked computer for the new print device. Otherwise, the networked computers are not able to use the newly added print device. Further, as new printer drivers are provided by manufacturers to correct previously discovered defects or to provide enhancements to previous printer drivers, each networked computer must receive a new printer driver. These actions can cause substantial network interruption while the new printer drivers are being installed.

In a network of the nature described above, wherein client computers employ the Windows® operating system, a separate file server installation is often used to enable communications between the client computers and network-connected printers. In order to determine network print function availability, a user of a client computer must have detailed information regarding precisely where to inquire to access network status information. In a network operating under the NetWare® environment (Novell Corporation, Provo, Utah), there are many pieces of status information that, together, affect an overall print operation. For instance, the Novell print server and queue management system both evidence status information regarding printer availability; however, their status information can only be accessed by knowing where (and how) to inquire. Further, even if the user knows how to obtain network status information, it is up to the user to understand the meaning of the status information.

SUMMARY

An extensible, network-based user interface allows remotely located resources to serve multiple clients. The user interface can be upgraded as improvements in resource capabilities are made, and as new products become available.

In an embodiment, the user interface includes a controller and other processing units and databases that collect, collate and process product and user information to dynamically construct client-specific user interfaces. The user interfaces may be used to select and control print options for networked printers. The network may be a local area network or the Internet. The user interface may maintain statistical information that is useable to predict technology trends, identify user preferences, and plan for maintenance and upgrade operations.

DESCRIPTION OF THE DRAWINGS

The detailed description will refer to the following figures in which like numerals refer to like objects, and in which.

DETAILED DESCRIPTION

Printer manufacturers provide separate printer drivers for different operating systems, and different versions of operating systems. The printer drivers allow connected computers to send printing requests to local (i.e., attached) or networked printers. Users are able to interface with some of the printer driver functionality, typically through a user interface. With the user interface, the user is able to choose a limited set of print options, and to monitor a status of a print job. FIG. 1C is a prior art user interface associated with a current, PC printer driver.

Current printer drivers and associated user interfaces have serious shortcomings. In particular, a separate printer driver must be constructed for each print device model and for each computer operating system. Furthermore, the printer driver, and the associated user interface, do not allow for convenient modification as printing requirements change, and as new print products are introduced.

An extensible user interface allows remotely located printers to serve multiple clients. The user interface can be upgraded as improvements in printing capabilities are made, and as new printing products become available.

Figure 2:
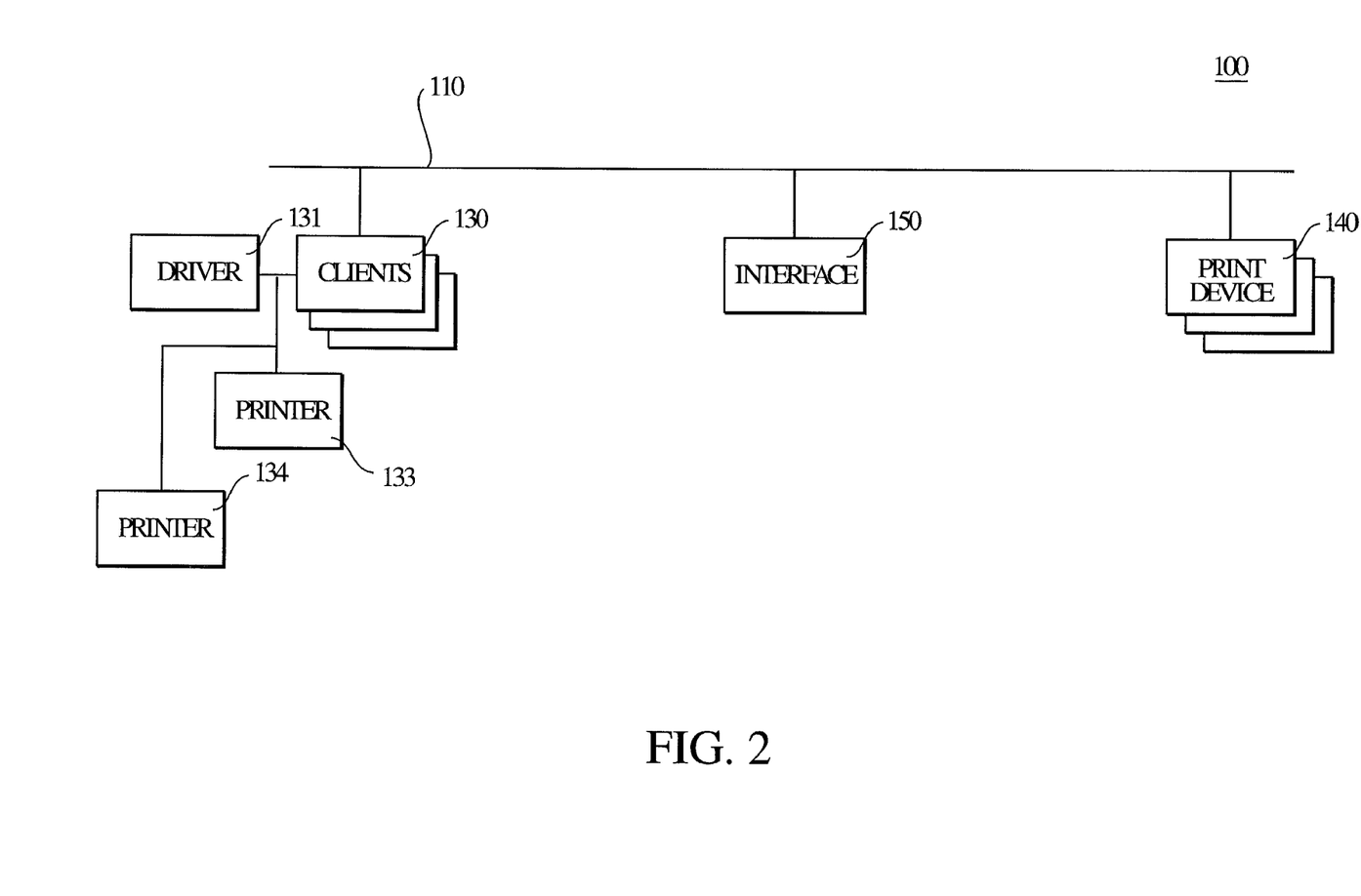
FIG. 2 is a diagram of a system that uses an extensible interface for remotely serving print options.

FIG. 2 is a diagram illustrating a system 100 that uses an extensible print interface. The system 100 includes a network 110 that couples clients 130 and print devices 140. Interposed between the clients 130 and the print devices 140 is an extensible print interface 150. Although the description that follows relates to the interface in the context of a networked printer application, those of ordinary skill in the art will appreciate that the interface 150 may be used as an extensible, networked-based mechanism to link one or more computers or similar processors or terminals to one or more networked resources. As such, the interface 150 may be used to efficiently conduct a variety of network-based operations, including e-mail, facsimile transmission, electronic commerce, and other operations.

The network 110 may be any communications network capable of transmitting digital data. In an embodiment, the network 110 may be the Internet. In alternative embodiments, the network 110 may be a local area network, a wide area network, or other similar networks. In addition, the network 110 may be a wired or a wireless network. Thus, in an embodiment, the clients 130 may communicate digital data with the print devices 140 using wireless Internet connectivity.

The clients 130 may be computers, such as personal computers (PC) and Macintosh computers, for example. The clients 130 may also be larger computer systems, including file servers, and other networked computer systems. The clients may be personal digital assistants (PDAs) or similar handheld computing technology.

The clients 130 may include a printer driver 131, which may be an application program written for a specific operating system and print device 140. The printer driver 131 may be used to send print requests to one or more of the print devices 140. Also shown attached to a client 130 are printers 133 and 134. The printers 133 and 134 may be local printers, as opposed to a networked printer (e.g., the print devices 140). In operation, the printer driver 131 may also drive the printers 133 and 134.

The print devices 140 may include a number of different printer models. For example, one of the print devices 140 may be a color laser printer and another print device 140 may be an ink-jet printer. The printer driver 131 loaded on the clients 131 may be capable of driving both the color laser printer and the ink-jet printer.

As new print devices 140 are developed, or as new print products are introduced, the printer drivers 131 may need to be upgraded to allow the clients 130 to use the new print devices 140 or print products. As noted above, such upgrades can be costly and time-consuming, and may result in clients 130 not being able to access the full range of print devices 140, or options provided by the print devices 140.

The extensible print interface 150 alleviates these and other problems by providing a remotely located, easily adaptable mechanism that can communicate between the clients 130 and the print devices 140. In its broadest sense, the interface 150 receives print requests from the clients 130 and generates a print command that is targeted to one or more specific print devices, according to client preferences, the nature of the print request, and the capabilities of the print devices 140. With the interface 150, print manufacturers and printer driver developers can deploy changes more efficiently, with reduced time to market, and with reduced costs and delivery charges. Furthermore, the interface 150 allows clients to customize their print jobs. In particular, the interface 150 allows clients 130 to become aware of other client preferences, and to adopt the other client preferences, if desired. In addition, the clients 130 have available a much broader range of print options than is traditionally provided with current print driver applications. Finally, the interface 150 allows printer manufacturers and other interested organizations to track usage of particular print options, features, and resources. The usage data may then be used to target specific product upgrades, thereby increasing the productivity of the printer manufacturer and providing greater client satisfaction.

Figure 3:
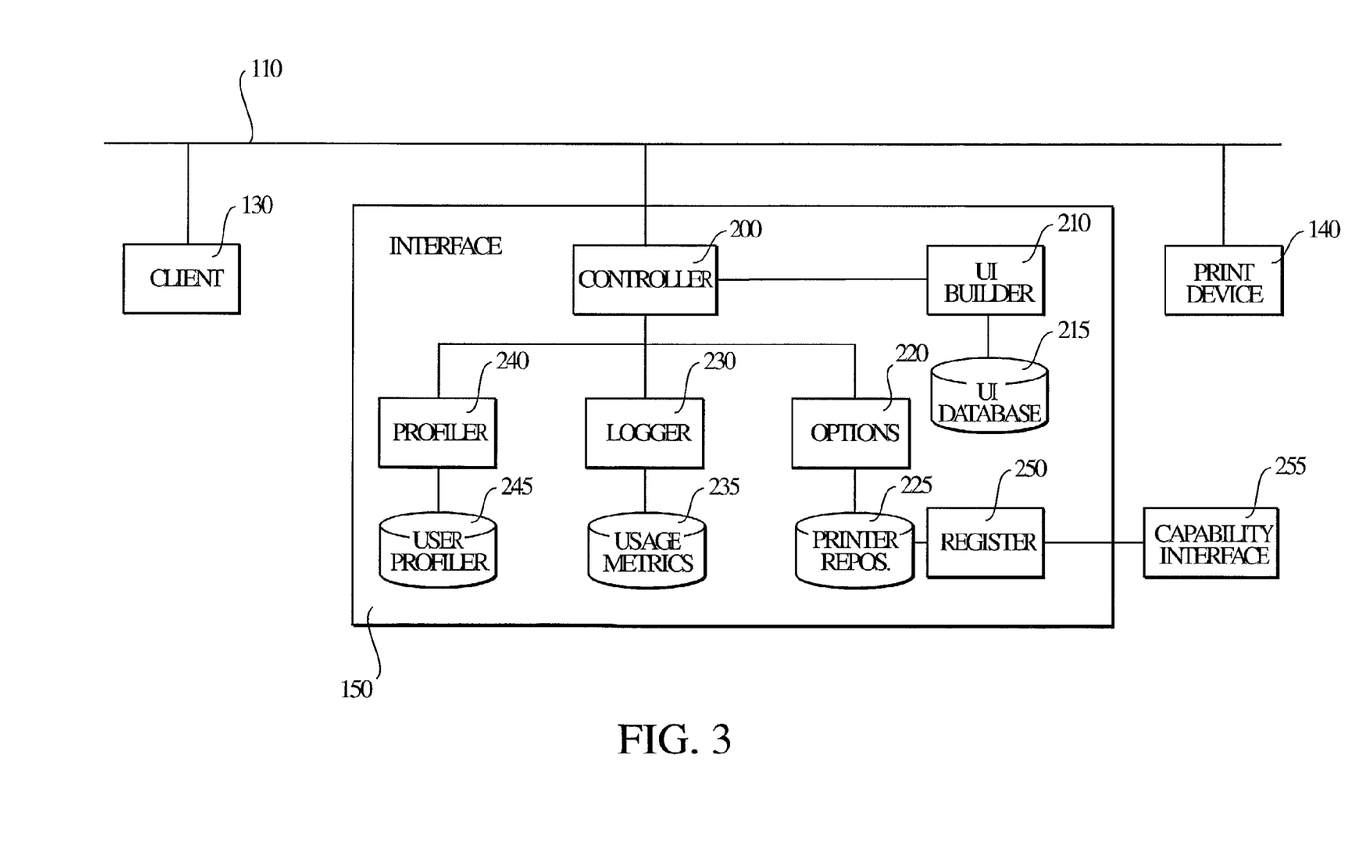
FIG. 3 is a diagram of the extensible interface of FIG. 2.

To accomplish these objectives, the interface 150 includes a number of design features and components, as shown in FIG. 3. A controller 200, which may be a central processor unit (CPU) or similar device, controls overall operation of the interface 150. In a preferred embodiment, the controller 200 is a software application running on a web application server. Coupled to the controller 200 is a user interface (UI) builder 210, an options module 220, loggers 230, and a profile module 240. The UI builder 210 is coupled to a UI database 215. The options module 210 is coupled to a printer repository 225. Coupled to the printer repository 225 is a register 250. The loggers 230 are coupled to a user metrics database 235. Finally, the profile module 240 is coupled to a user profiles database 245. In effect, the UI database 215, the printer repository 225, the metrics database 235, and the user profiles database 245 comprise data storage devices that are used by other components of the interface 150 to implement print serving functions.

As noted above, the interface 150 is coupled through the network 110 to the print devices 140 and the clients 130. Also coupled to the interface 150 is a capabilities interface 255, shown connected at the register 250.

The interface 150 may be implemented as a print options server, including a web site server, a standalone computer, a LAN server, or other centrally-located computing resource. The controller 200 may be implemented as a computer program resident on a central server or computer, or on a special integrated circuit, and the databases 215, 225, 235 and 245 may implemented as one or more conventional data storage devices, including data servers, hard drives, optical disks, and other magnetic storage media. The databases 215, 225, 235 and 245 may be separate physical entities, or may be incorporated into a single data storage device.

The register 250 receives printer capability information, and other print resource information, and provides the information to the printer repository 225. The printer capability information may be updated with the introduction of a new printer model, or a modification to one or more products that can be used as a printing media. For example, if a new printer paper with a specific weight and surface texture is introduced, the printer capability may be updated to reflect the unique handling characteristics of the new paper. In particular, with the new paper, the print devices 140 may have to operate at a different print speed, or a different dots-per-inch (laser printers) in order to provide a high quality output document. These updated parameters are provided to the interface through the register 250, and are stored in the printer repository 245. Of course, the printer repository 245 will be initially loaded with capabilities information for existing print devices 140.

The UI builder 210 uses information from the UI database 215 to build customized user interfaces that may be provided to each of the clients 130. The first time a client 130 registers with the interface 150, the client 130 may be presented with a default user interface. As the client 130 interacts with the interface 150, the interface 150 will "learn" user preferences of the client 130 and will use the user preferences to develop the customized user interface.

The interface 150 begins its task of building a customized user interface by recording information unique to each of the clients 130 as the clients 130 interact with the interface. Of course, the interface 150 will provide appropriate privacy measures, including an opt out option for clients 130 that do not want their user information recorded and stored at the interface 150, and the ability to review the information and request its alteration or deletion at any time. Individual clients 130 will have user profiles constructed and stored in the user profiles database 245. The user profiles may be updated as additional information related to the client 130 is received at the interface 150.

To collect the information needed to construct a user profile, the profile module 240 records, or logs user information into the profiles database 245. Each time a client 130 interacts with the interface 150, the profile module 240 may note specific print options actually used by the client 130. The profile module 240 will also note the identity of the client 130, which may be an Internet address, or local network address, for example. The profile module 240 uses the identity (address) of the client 130 to ensure that the recorded usage metrics information is recorded in the proper file within the user profiles database 245.

The user profile information may include the type of printer selected (e.g., a laser printer, gray scale or color printer, plotter), print language (PCL, POSTSCRIPT), paper size and layout, paper quality, and other user profile information. In cases where the client 130 does not choose specific print options, the controller 200 may execute a routine to choose the options most appropriate to the requested print job. In this situation, the profile module 240 may record the choices made by the controller 200. The information related to the controller-selected option may be stored in the client's file with a flag indicating an option that was selected by the controller 200. In an alternate embodiment, controller-selected option information is not recorded in the user profiles database 245.

As noted above with respect to FIG. 2, the client 130 may elect to send a print request to the attached printer 133, in which case, the interface 150 may still provide a customized user interface. To account for options at the attached printer 133, the interface 150 may, using techniques well known in the art, record the options information related to a print request to the attached printer 133. Such techniques include the use of cookies, and other mechanisms.

The loggers 230 may also be used to capture selected data related to use of the print devices 140 by the clients 130. The captured data may be processed by the loggers 230. Whether processed or not, the captured data are then stored in the usage metrics database 235. The usage metrics database 235 may be used to track use of various print options, and features, use of print resources, and usage of specific print devices. Thus, the usage metrics database can be used as a tool to track preferences across a wide number of clients, to determine which print devices are favored by the clients 130, to track usage hours (or pages printed) to support maintenance programs and consumable inventory management programs, and to provide manufacturers with an input regarding possible design improvements. The usage metrics database 235 can also be used to record average print queue times, and maximum queue times, and to correlate these times with time of day information, in order to track peak usage times, and to determine if additional printer capacity is needed.

As an example, the usage metrics database may record that a grayscale laser printer supports 95 percent of the printing jobs, an color ink jet printer supports 3 percent of the print jobs, and that a plotter and a color laser printer support 2 percent of the print jobs. Using this information, a network manager may predict cartridge replacement requirements, may schedule more frequent manufacturer maintenance visits for the gray scale printers, and less frequent visits for the other printers. The network manager may determine that a printer lease contract is not optimum because of excess costs per page charges. The network manager may also determine that a more fully-featured grayscale printer should be leased upon expiration of a current printer lease.

The metrics database 235 may also be used when the UI builder 210 constructs customized user interfaces. For example, the UI builder 210 may use preference information that is common to a large number of clients when constructing a specific user interface. The UI builder 210 may also use the common preference information to construct a default user interface. The default user interface may be presented to a new client 130 the first time the new client 130 accesses the interface 150.

The printer repository 225 stores printer capability data, and other printer resource data received from the register 250. The printer capability data may be supplied and updated when new print devices 140 enter the market, when print devices are upgraded, and when associated print resources are introduced or upgraded.

The option module 220 uses the stored data from the printer repository 225 to construct a suite of printer features. For example, a new print device may be capable of duplex printing. The duplex printing capability is received by the register 250 and stored in the printer repository 225. The options module can then use this new capability to construct a new, duplex print option. The duplex print option is then provided to the UI builder 210.

In addition to providing option information to the UI builder 210, the option module 220 can generate alert messages to indicate to clients 130 when a new capability is available on the system 100. For example, the options module 220 may send an e-mail message to all registered clients 130 to describe the new duplex print capability.

In an embodiment, the UI database 215 includes pre-built, customer-specific user interfaces. The customer-specific user interfaces may be constructed when client 130 first registers with the system 100, and may be updated thereafter as the client's preferences appear to change, or to accommodate new technology, for example. The customer-specific user interfaces may be stored with a user (client) identification so that upon connection with the client 130, or upon receipt of a print request, the UI builder 210 can retrieve the appropriate user interface from the UI database 215.

In an alternative embodiment, the UI database 215 stores a series of user interface templates. When a client 130 sends a print request through the interface 150, the UI builder may select one of the templates, and then dynamically modify the template to suit the client's preferences and the capabilities of the optimum print device.

In yet another embodiment, the UI database 215 includes a hierarchical menu of print option screens. The print option screens are displayed at the client 130, allowing a user to select desired features. For example, a first print option screen may prompt the user to select a printer from a list of available print devices 140. The first print option screen may include a default printer (e.g., the network printer most recently used by the client 130.). If a local (attached) printer is available, the first print option screen may allow the user to select the attached printer.

Once the client 130 has entered a printer choice, the client 130 may be presented with other print option choices using user interfaces. For example, the client 130 may be able to select duplex printing, color printing, select fonts, and other print options. The option screens presented to the client 130 may vary based on the actual print device 140 selected previously. The print option screens can then continue in the hierarchical fashion until all print options are selected, or a default value is selected.

As noted above, the client-specific user interfaces may comprise a hierarchical menu structure where subsequent print option screens are presented based on selections made by the client in prior print option screens. Alternatively, the clients 130 may be presented with user interfaces that are customized based on the client's user preferences. In an embodiment, the UI builder 210 may dynamically construct the user interface. In effect, the UI builder 210 takes data from the user profile database 245, the usage metrics database 235, the printer repository 225, and creates the user interfaces. The user interface construction may be partly completed in advance of a client submitting a print job request. Such prior construction is based on known information in the user profile database 245, and other databases. The remainder of the user interface may then be dynamically developed.

The UI builder 210 may also dynamically develop a user interface by providing a series of print option menus, depending on prior print option selections made by the client 130.

Working with the controller 200, the UI builder 210 provides the user interfaces to the client 130. In an embodiment, the thus-provided user interface may be stored on the client 130 for an indefinite time, or may exist on the client 130 for a limited time. The client 130 provides information from the printer driver to the selected print device 140 to initiate the print process.

When an attached printer is to be used to complete the print job, the UI builder 210 may provide the client 130 with a latest version of the printer driver. The client 130 may then store the printer driver (may replace or update parts of an existing printer driver) for use with the current print job, and for use with subsequent print jobs. To receive the latest version of the printer driver, the client 130 must of course be "online" or connected to the interface 150. If the client 130 is always connected, the interface may provide updates to the printer driver whenever the updates are available. If the client 130 uses a dial-up connection, such updates may be provided when the client 130 establishes a connection with the interface 150. Once the most recent printer driver is loaded, the client 130 may use the loaded printer driver to execute print jobs using either the print devices 140 or the attached printer 133. The printer devices may be updated in whole or in part.

In an alternative embodiment, the printer driver resides at an Internet web site or LAN node, and the client's selections are passed to the selected print device 140 by the controller 200.

In FIG. 2, the network 110 is shown as either a LAN, WAN or the Internet. However, the same functionality could exist with a LAN or WAN coupled to the Internet. In this embodiment, the LAN, for example, may include one or more networked printers, and any of the networked computers of the LAN may use the networked printers for printing jobs. However, the LAN may also be coupled to the Internet, so that the networked computers may also use print devices coupled to the Internet.

Figure 4:
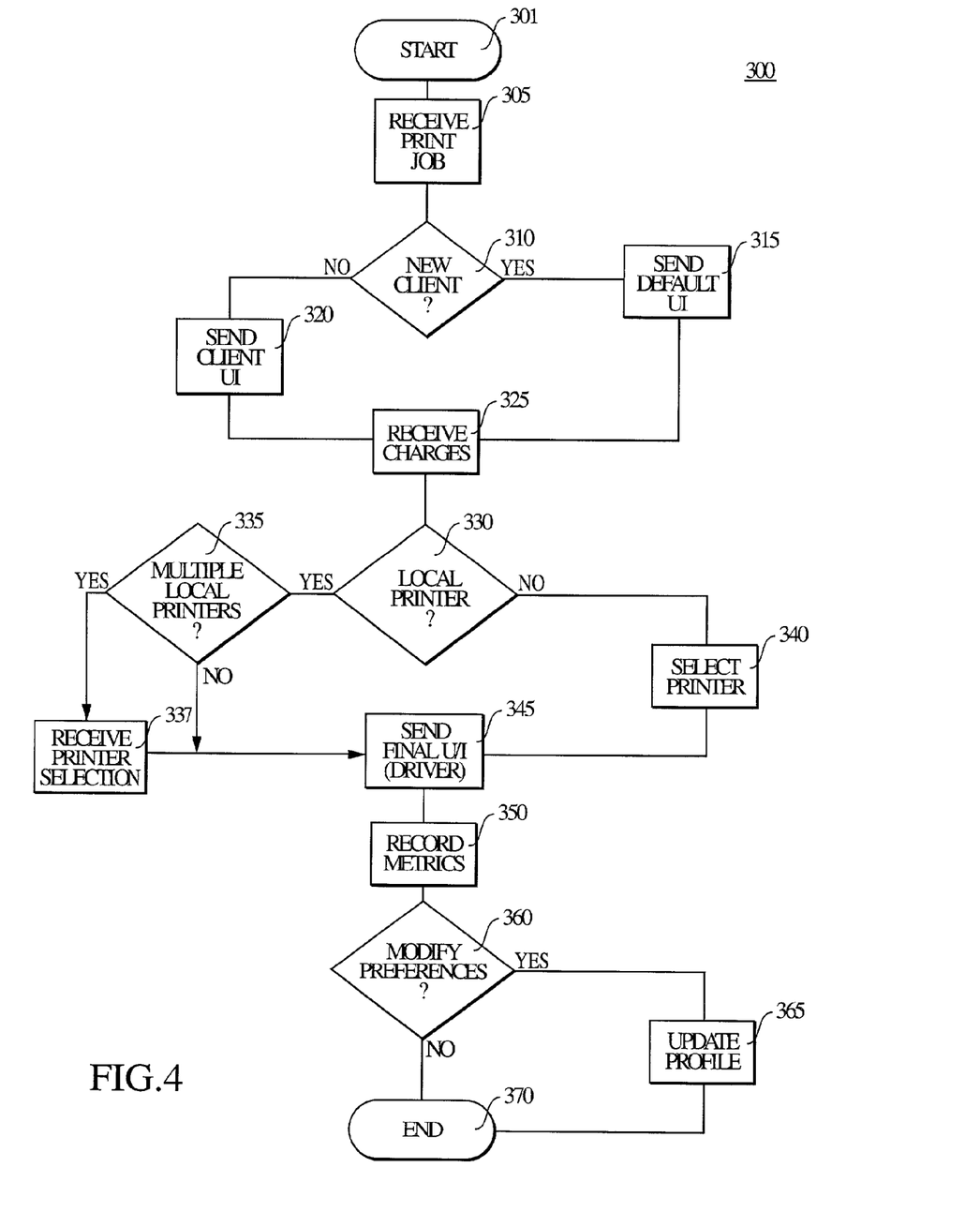
FIG. 4 is a flow diagram showing an operation of the extensible interface of FIG. 3.

FIG. 4 is a flowchart illustrating an operation 300 of the user interface 150 of FIG. 3. The operation 300 begins in block 301. In block 305, the interface 150 receives a print job request from a client 130. In block 310, the controller 200 determines if the client 130 is a new client. If the client 130 is a new client, the UI builder 210 sends the client a default user interface, block 315, for the specific printer 140 that the client 130 will use. However, the default user interface may include features that specifically support the architecture of the client 130.

If the client 130 is not a new client, the UI builder sends the client 130 a custom user interface, block 320. In block 325, the controller 200 receives any user settings or selectors or changes the user made to the user interface from the client 130. In block 330, the controller 200 determines if the client 130 will use a local printer. If the client 130 will use a local printer, in block 335 the controller 200 determines if there are multiple local printers (e.g., the printers 133 and 134). In block 337, the controller 200 receives a local printer selection. The operation then moves to block 345 and continues. If the client 130 will use a network print device 140, the controller 200 selects the appropriate print device, block 340. In block 345, the controller 200 sends the final UI to the client 130.

In block 350, the logger 230 collects metrics information from the client 130. If the client 130 is using an attached printer 133 and is not connected to the network 110 at the time of printing, such metrics information may be received at a later time.

In block 360, the profiler 240 determines if the user profile should be modified. In block 365, the profiler 240 makes changes to the user profile. The operation ends in block 370.

Figure 5:
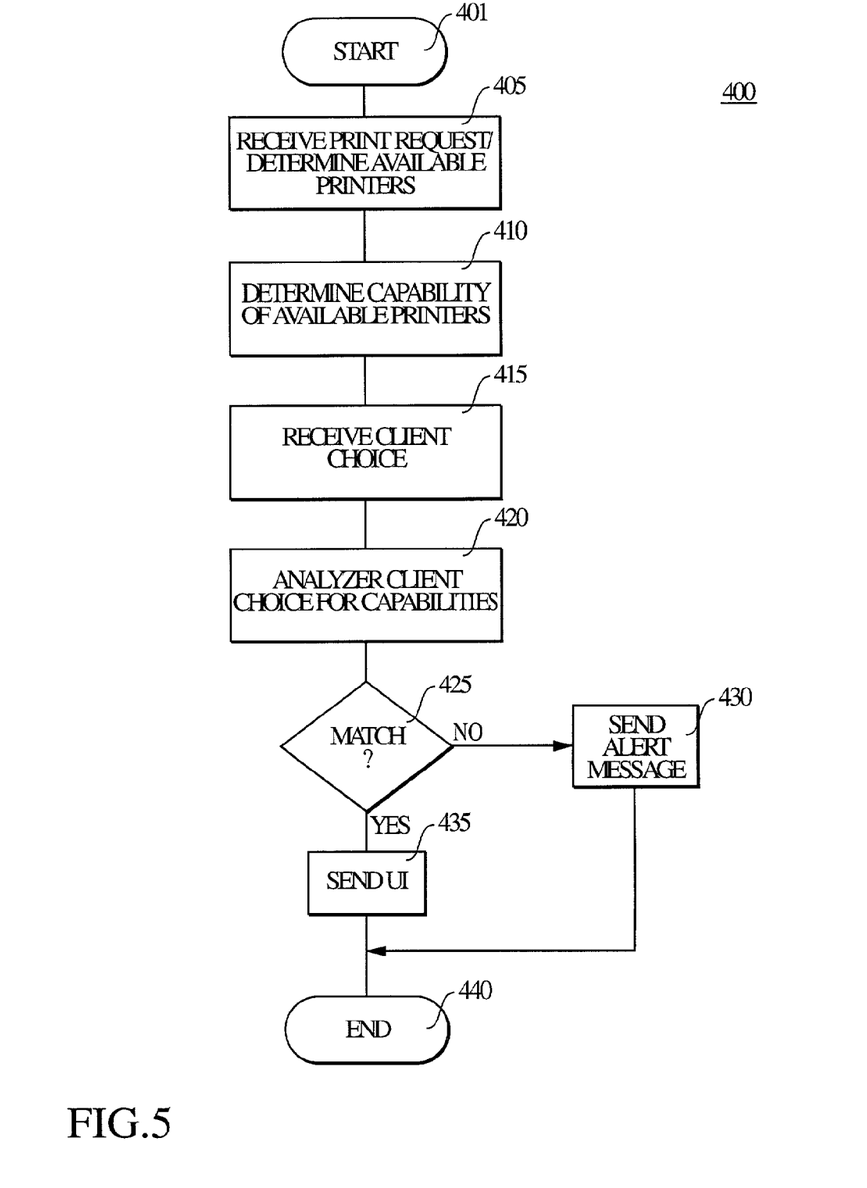
FIG. 5 is a flow diagram showing an alternate operation of the extensible interface of FIG. 3.

FIG. 5 is a flowchart illustrating an alternative operation 400 of the interface 150 of FIG. 3. The operation 400 begins in start block 401. In block 405, the controller 200 receives a print request from a client 130, and determines which printers are available to satisfy the print request. In block 410, the controller 200 determines capabilities of the available printers identified in block 405. The controller 200 may provide a list of available printers for display to the client 130, and may send a prompt to the client to select a printer.

In block 415, the controller 200 receives the client's printer selection. In block 420, the controller 200 compares the capabilities of the client's printer choice to requirements of the print request. In block 425, the controller 200 determines if the capabilities match the requirements. If there is no match, the controller 200 may send an alert message to the client 130 (block 430). The operation 400 then ends (block 440). If in block 425 the controller 200 finds a match, the controller 200 sends a UI to the client (block 435). The operation 400 then ends (block 440).

The description provided above relates to a dynamic user interface operating to support print options. However, a similar structure may be used to support other networked operations. Examples of such networked operations include processing and delivery of electronic mail, facsimile transmission and printing, and other operations in which a networked computer may interact with remote resources to provide a service for the networked computer.

In the illustrated embodiments, the interface 150, and its sub-components, may be implemented as a single, special purpose integrated circuit (e.g., an ASIC) having a main or central processor section for overall, system-level control, and separate circuits dedicated to performing various different computations, functions and other processes under control of the central processor section. Those skilled in the art will appreciate that the interface 150 may also be implemented using a plurality of separate, dedicated or programmable integrated or other electrical circuits or devices (e.g., hardwired electronic or logic circuits such as discrete element circuits, or programmable logic devices such as PLDs, PLAs, or PALs). The interface 150 may also be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts similar to those shown in FIGS. 4 and 5 can be used as the interface 150, or its sub-components.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

The invention claimed is:

1. A network-based user interface system, comprising:
   an extensible resource interface located at a first network node and adapted for coupling to a plurality of client devices each located at one of a plurality of second network nodes different from the first network node, the extensible resource interface including
   a register configured to collect resource information from one or more resources located at other than the first network node;
   an options module configured to provide resource options based on the resource information;
   a user profiler configured to construct profiles for at least some of the client devices, each profile indicative of client-specific resource options; and
   a user interface builder configured to construct from the resource options and a particular one of the profiles a customized user interface for display by the corresponding one of the client devices and further configured to provide the customized user interface to the corresponding one of the client devices over the network, the customized user interface indicative of the corresponding client-specific resource options.

2. The system of claim 1, wherein the customized user interface is provided to the corresponding one of the client devices.

3. The system of claim 1, wherein the customized user interface is retained by the user interface system.

4. The system of claim 1, wherein the first network node is a node in a local area network.

5. The system of claim 1, wherein the first network node is an Internet web site.

6. The system of claim 1, wherein the customized user interface comprises a user interface to a printer driver.

7. The system of claim 6, wherein the customized user interface comprises a hierarchical menu of printer option screens, wherein one or more of the printer option screens is provided dynamically based on user preferences, printer capabilities, and user print option selection.

8. The system of claim 1, wherein the user profiler is further configured to record the client-specific resource options preferred by individual ones of the client devices.

9. The system of claim 8, wherein the user profiler is further configured to record the preferred client-specific resource options as usage metrics.

10. The system of claim 1, wherein the customized user interface is pre-built.

11. The system of claim 1, wherein the customized user interface is built when the corresponding one of the client device registers with the user interface system.

12. The system of claim 1, wherein the customized user interface is rebuilt when the corresponding one of the client device changes preferences.

13. The system of claim 1, wherein the one or more resources is a plurality of resources.

14. The system of claim 1, wherein the resources are printers.

15. The system of claim 1, wherein each profile includes at least one of a printer type, a print language, a print media size, or a print media layout.

16. The system of claim 1, wherein a particular one of the client devices and a particular one of the resources are located at a same network node, wherein the user interface builder provides at least part of an application program associated with the particular resource to the particular client device, wherein the application program is configured to control the particular resource, and wherein the customized user interface is configured to access the application program.

17. The system of claim 1, wherein the extensible resource interface further includes a logger configured to capture usage data of the resources by the client computers.

18. The system of claim 1, wherein each of the client devices is a device selected from the group consisting of a computer, a computer system, a file server, or a handheld computing device.

19. The system of claim 1, wherein the other network node is a third network node different from the first network node and the plurality of second network nodes.

20. The system of claim 1, wherein the other network node is one of the plurality of second network nodes.

21. The system of claim 1, wherein the resource options are indicative of operational features of the resources.

22. A network-based user interface system, comprising:
an extensible resource interface located at a first network node and adapted for coupling to a plurality of client devices each located at one of a plurality of second network nodes different from the first network node, the extensible resource interface including
means for collecting resource information from one or more resources located at other than the first network node; and
means for providing over the network from the extensible resource interface to a particular one of the client devices a customized user interface for a particular one of the resources, the customized user interface based on the resource information and on user preferences associated with the particular one of the client devices, the customized user interface further displayable by the particular one of the client devices.

23. The system of claim 22, comprising:
means for recording usage metrics indicative of the user preferences.

* * * * *